United States Patent
Jog et al.

(10) Patent No.: US 9,018,328 B2
(45) Date of Patent: Apr. 28, 2015

(54) POLYMERIZATION PROCESS FOR OLEFIN-BASED POLYMERS

(75) Inventors: Prasanna K. Jog, Midland, MI (US);
Robert D. Swindoll, Clute, TX (US);
Nile A. Mead, Lake Jackson, TX (US);
Pradeep Jain, Lake Jackson, TX (US);
Alec Y. Wang, Lake Jackson, TX (US);
Job D. Guzman, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 805 days.

(21) Appl. No.: 13/377,920

(22) PCT Filed: Jul. 15, 2010

(86) PCT No.: PCT/US2010/042139
§ 371 (c)(1),
(2), (4) Date: Dec. 13, 2011

(87) PCT Pub. No.: WO2011/008955
PCT Pub. Date: Jan. 20, 2011

(65) Prior Publication Data
US 2012/0088893 A1    Apr. 12, 2012

Related U.S. Application Data

(60) Provisional application No. 61/226,046, filed on Jul. 16, 2009.

(51) Int. Cl.
| | |
|---|---|
| C08F 10/02 | (2006.01) |
| C08F 6/12 | (2006.01) |
| C08F 10/06 | (2006.01) |
| C08J 11/02 | (2006.01) |

(Continued)

(52) U.S. Cl.
CPC ............. *C08F 10/02* (2013.01); *C08J 2323/08* (2013.01); *C08F 6/12* (2013.01); *C08F 10/06* (2013.01); *C08J 11/02* (2013.01); *C08F 2/06* (2013.01); *C08J 2323/06* (2013.01); *C08J 2323/12* (2013.01); *C08J 2323/14* (2013.01); *C08F 210/18* (2013.01)

(58) Field of Classification Search
USPC .......................... 524/848; 526/348, 351, 352
See application file for complete search history.

(56) References Cited

U.S. PATENT DOCUMENTS

| | | | |
|---|---|---|---|
| 2,945,016 A | 7/1960 | Benedict et al. | |
| 3,496,135 A | 2/1970 | Caywood et al. | |

(Continued)

FOREIGN PATENT DOCUMENTS

| | | | |
|---|---|---|---|
| CA | 2372121 A1 | 11/2000 | |
| DE | 19905029 A1 | 11/2000 | |
| EP | 0184935 A2 | 6/1986 | |

*Primary Examiner* — Richard A Huhn

(57) ABSTRACT

The invention provides a solution polymerization process comprising: A) polymerizing one or more monomers in the presence of a solvent that comprises a heavy hydrocarbon solvent and a light hydrocarbon solvent, to form a polymer solution; B) transferring the polymer solution to a Liquid-Liquid Separator, without adding heat to the solution, and wherein the pressure of the polymer solution is actively reduced in a controlled manner prior to, or within, the Liquid-Liquid Separator, to induce at least two liquid phases, a polymer-rich phase and a solvent-rich phase, and wherein the concentration of polymer in the polymer-rich phase is higher than that in the polymer solution transferred to the Liquid-Liquid Separator; and C) removing the solvent-rich phase.

15 Claims, 2 Drawing Sheets

(51) Int. Cl.
*C08F 2/06* (2006.01)
*C08F 210/18* (2006.01)

(56) References Cited

U.S. PATENT DOCUMENTS

| | | | |
|---|---|---|---|
| 3,553,156 A | 1/1971 | Anolick et al. | |
| 3,726,843 A | 4/1973 | Anolick et al. | |
| 3,781,253 A | 12/1973 | Mori et al. | |
| 4,319,021 A | 3/1982 | Irani et al. | |
| 4,433,121 A | 2/1984 | Kabu et al. | |
| 4,444,922 A | 4/1984 | Gutowski et al. | |
| 4,623,712 A | 11/1986 | Irani et al. | |
| 4,673,768 A | 6/1987 | Yeates | |
| 4,857,633 A | 8/1989 | Irani et al. | |
| 4,946,940 A | 8/1990 | Guckes et al. | |
| 5,264,536 A | 11/1993 | Radosz | |
| 5,599,885 A | 2/1997 | Kawasaki et al. | |
| 6,255,410 B1 | 7/2001 | Shigekauzu et al. | |
| 6,683,153 B1 | 1/2004 | Arlt et al. | |
| 6,881,800 B2 | 4/2005 | Friedersdorf | |
| 7,163,989 B2 | 1/2007 | Friedersdorf | |
| 7,279,536 B2 | 10/2007 | Brant et al. | |
| 7,429,634 B2 | 9/2008 | Brant et al. | |
| 7,629,397 B2 | 12/2009 | McDonald et al. | |
| 7,650,930 B2 | 1/2010 | Cheluget et al. | |
| 8,143,352 B2 | 3/2012 | Kiss et al. | |
| 2007/0244279 A1 | 10/2007 | Jiang et al. | |
| 2007/0299161 A1 | 12/2007 | McDonald et al. | |
| 2008/0027173 A1 | 1/2008 | Ravishankar | |
| 2008/0028104 A1 | 1/2008 | Tsuneki | |
| 2008/0033127 A1 | 2/2008 | Jiang et al. | |
| 2008/0055729 A1 | 3/2008 | Li et al. | |
| 2008/0090974 A1 | 4/2008 | Brant et al. | |
| 2008/0234443 A1 | 9/2008 | Kiss et al. | |
| 2008/0281040 A1 | 11/2008 | Kiss et al. | |
| 2009/0259005 A1 | 10/2009 | Kiss et al. | |
| 2011/0313115 A9 | 12/2011 | Friedersdorf et al. | |

POLYMERIZATION PROCESS FOR OLEFIN-BASED POLYMERS

REFERENCE TO RELATED APPLICATIONS

This application claims the benefit of U.S. Provisional application No. 61/226,046, filed on Jul. 16, 2009, and fully incorporated herein by reference.

BACKGROUND OF THE INVENTION

A polymer solution can exhibit Lower Critical Solution Temperature (LCST) phenomenon, whereby a homogeneous polymer solution separates into a polymer rich liquid phase and a solvent-rich phase above a certain temperature. This temperature is a function of solvent type, polymer stream composition and pressure. Any of these variables can be manipulated to a induce liquid-liquid separation. This separation has very small heat duty associated with it, especially compared to the vaporization of an equivalent amount of solvent. In commercial solution polymerizations, there is a need to increase efficiency and reduce costs associated with solvent removal processes.

U.S. Pat. No. 6,881,800 relates to processes and plants for continuous solution polymerization. Such plant and processes include a pressure source; a polymerization reactor, downstream of said pressure source; a pressure let-down device, downstream of said polymerization reactor; and a separator, downstream of said pressure let-down device. The pressure source is disclosed as sufficient to provide pressure to the reaction mixture during polymerization to produce a single-phase liquid reaction mixture in the reactor, and a two-phase liquid-liquid reaction mixture in the separator, in the absence of an additional pressure source between the reactor and the separator. See also U.S. Pat. No. 7,163,989. This process discloses the use of a heater to heat the reactor outlet stream, prior to inducing liquid-liquid phase separation. Since the solution coming out of the reactor has more solvent per pound of polymer than that coming out of the separator, heating prior to the separator significantly increases the heat duty per pound of polymer.

International Publication No. WO 2008/076589 discloses a process for polymerizing olefins in a dense fluid, homogeneous polymerization system. The process comprises the following steps: (a) contacting, in one or more reactors, olefin monomers having three or more carbon atoms present at 30 weight percent, or more, with the following: 1) one or more catalyst compounds, 2) one or more activators, 3) from 0 to 50 mole percent comonomer, and 4) 0 to 40 weight percent diluent or solvent; (b) forming a reactor effluent comprising the polymer-monomer mixture; (c) optionally heating the polymer-monomer mixture of (b), after it exits the reactor, and before, or after, the pressure is reduced in step (e); (d) collecting the polymer-monomer mixture of (b) in a separation vessel; (e) reducing the pressure of the reactor effluent comprising the polymer-monomer mixture of (b) below the cloud point pressure to form a two-phase mixture comprising a polymer-rich phase and a monomer rich phase, either before, or after, collecting the polymer-monomer mixture in the separation vessel. The pressure in the reactor is from 7 to 100 MPa higher than the pressure in the separation vessel, and the temperature in the separation vessel is above the higher of the crystallization temperature of the polymer, or above 80° C., if the polymer has no crystallization temperature. The monomer-rich phase is separated from the polymer-rich phase, and recycled to one or more reactors. This patent discloses that a reactor pressure required to run this process with less than 40 weight percent solvent is high (up to 200 MPa), to ensure supercritical polymerization medium. This high pressure makes the reactor operation challenging, and requires the use of thick walled reactors which reduce capital and energy efficiency.

U.S. Pat. No. 6,255,410 discloses processes for producing polyolefins at pressures substantially below conventional high pressure conditions in two-phase systems. The process comprises the following steps: (a) continuously feeding olefinic monomer and catalyst system of metallocene and cocatalyst; (b) continuously polymerizing monomer feed to provide a monomer-polymer mixture; and (c) continuously settling a two phase mixture into a continuous molten polymer phase and a continuous monomer vapor, the latter of which may, optionally, be at least partly recycled to (a). In step (b), the mixture is at a pressure below the cloud point pressure to provide a polymer-rich phase and a monomer-rich phase at a temperature above the melting point of the polymer, and the polymerization takes place at a temperature and a pressure, where the catalyst system productivity exceeds that which is obtained at twice said pressure above the cloud point at that temperature. This patent discloses only minor amounts of solvent, as required for a catalyst carrier, and does not have the advantages of using lower temperatures and pressures associated with solution polymerization processes.

U.S. Pat. No. 4,444,922 discloses a method for processing a polymer solution by changing the thermodynamic state of the solution to produce a dilute phase and a concentrated phase by spinodal decomposition. This reference discloses a method for processing a conjugated diene polymer solution, at an elevated pressure and temperature, and comprising the step of rapidly reducing the pressure of said heated solution to a pressure sufficiently low to cause said solution to form, by spinodal decomposition, a first phase having a relatively low polymer concentration and a second phase having a relatively high polymer concentration. This patent discloses three methods to induce liquid-liquid phase separation, which all include adding heat to induce the liquid-liquid separation. Each methods is expensive and energy intensive, in part, since the entire reactor solution must be heated.

U.S. Pat. No. 4,433,121 discloses a polymerization that is carried out in a polymerization zone, at a temperature above the upper cloud point of said polymer solution, and under conditions which enable the polymer solution to be separated into two phases. The polymerization is also carried out under stiffing conditions, which maintain the two phases under said phase-separating conditions, in a dispersed and mixed state. The resulting polymer solution is sent to a separating zone, located independently of said polymerization zone, and is separated into two phases at a temperature above the upper cloud point. Thereafter, the polymer-rich liquid phase, as a lower layer, is recovered, while the polymer-lean liquid phase, as an upper layer, is recycled to the polymerization zone. There is an inherent challenge of operating the solution polymerization reactor in two liquid phase region. Since the polymer microstructure is determined by the components' concentrations in the reactor, the distribution of the components in both phases will have impact in the product composition and molecular weight. Subsequently, increased variability in the final product may result.

U.S. Pat. No. 5,599,885 discloses a polyolefin polymerization that is carried out in the presence of an aliphatic hydrocarbon diluent or an alicyclic hydrocarbon diluent having a boiling point below 100° C. In one embodiment, a polymer solution containing the resulting polyolefin is fed to a separation zone, kept at a temperature of not lower than the upper cloud point of the polymer solution, to separate the polymer solution into a lower phase portion, containing a high concentration of polyolefin, and an upper phase portion, containing a lower concentration of the polyolefin. See also EP0552945B1. The liquid-liquid separation achieved by raising temperature is not efficient, since there is a time limit on how fast the entire reactor content can be heated. Such a means of separation inevitably leads to at least partial liquid-liquid separation through a "nucleation and growth" mechanism rather than a spinodal decomposition.

U.S. Pat. No. 4,319,021 discloses a process for recovering a polymer from a solution of the polymer in a solvent, by a high temperature phase separation, in which a low molecular weight hydrocarbon is added to the solution, the solution and the added hydrocarbon are subjected to a temperature and pressure so that one liquid phase is formed. The pressure is reduced to form three phases, namely, a vapor phase rich in the hydrocarbon, a polymer-lean liquid phase, and a polymer-rich liquid phase. The polymer-rich liquid phase is separated from the vapor phase and the polymer-lean liquid phase, and the polymer is then recovered from the polymer-rich liquid phase. In this process, the light hydrocarbon solvent is added after the reactor to induce phase separation. This in turn requires a separation of the reactor solvent and un-reacted co-monomers and this added light hydrocarbon, for the process to run continuously. This separation can be difficult, particularly when the co-monomers have volatility that is close to that of the light hydrocarbon that is added to induce phase separation. Pressurizing the polymer solution, and heating it, before inducing phase separation, is very inefficient.

International Publication No. WO 2008/082511 discloses a process for fluid phase in-line blending of polymers. The process includes providing two or more reactor trains configured in parallel, a separator for product blending and product-feed separation. In at least one of the parallel reactor trains, olefin monomers having three or more carbon atoms, catalyst systems, optional comonomers, optional scavengers, and optional inert diluents or inert solvents, are reacted at a temperature above the solid-fluid phase transition temperature of the polymerization system, and a pressure no lower than 10 MPa below the cloud point pressure of the polymerization system and less than 1500 MPa, to form a reactor effluent, that includes a homogeneous fluid phase polymer-monomer mixture in each parallel reactor train. The reactor effluents from each parallel reactor are combined, and passed through the separator. See also U.S. Publication 2008/0234443.

International Publication No. WO 2008/109212 discloses a process to polymerize olefins, comprising contacting propylene, at a temperature of 65° C. to 150° C., and a pressure of 1.72 to 34.5 MPa, with: 1) a catalyst system comprising one or more activators and one or more nonmetallocene metal-centered, heteroaryl ligand catalyst compounds, 2) optionally one or more comonomers selected from ethylene and C4 to C12 olefins, 3) diluent or solvent, and 4) optionally scavenger. The olefin monomers and any comonomers are present in the polymerization system at 30 wt % or more, and the propylene is present in the feed at 80 wt % or more. The polymerization occurs at a temperature above the solid-fluid phase transition temperature of the polymerization system, and a pressure greater than 1 MPa below the cloud point pressure of the polymerization system, and the polymerization occurs at a temperature below the critical temperature of the polymerization system, or at a pressure below the critical pressure of the polymerization system.

International Publication No. WO 2008/079565 discloses a process to polymerize olefins, comprising contacting one or more olefin monomers having three or more carbon atoms, with a catalyst system comprising one or more activators and one or more nonmetallocene metal-centered, heteroaryl ligand catalyst compounds, 2) optionally one or more comonomers, 3) optionally diluent or solvent. The olefin monomers and any comonomers are present in the polymerization system at 40 wt % or more, and the monomer having three or more carbon atoms is present at 80 wt % or more, based upon the weight of all monomers and comonomers present in the feed. The polymerization occurs at a temperature above the solid-fluid phase transition temperature of the polymerization system, and a pressure no lower than 10 MPa below the cloud point pressure of the polymerization system, and less than 1500 MPa. If the solid-fluid phase transition temperature of the polymerization system cannot be determined, then the polymerization occurs at a temperature above the fluid phase transition temperature. See also U.S. Publication 2008/0153996.

International Publication No. WO 2008/109094 discloses a monomer recycle process for fluid phase in-line blending of polymers. The monomer recycle process includes providing a first group (G1) of one or more reactor trains, and a second group (G2) of one or more reactor trains, and one or more separators fluidly connected to G1 and G2. In each of G1 and G2 olefin monomers are polymerized to form homogenous fluid phase polymer-monomer mixtures, wherein each of the G1 and G2 has at least one common monomer. The reactor effluents from G1 are passed through the G1 separators to separate a monomer-rich phase from a polymer-enriched phase, and the polymer-enriched phase and the reactor effluents from G2 are passed into the G2 separator to separate another monomer-rich phase from a polymer-rich blend. The monomer-enriched phase is recycled.

Additional polymerization processes or polymer separation processes are disclosed in U.S. Pat. Nos. 3,781,253; 3,553,156; 3,726,843; 3,496,135; 4,857,633; 4,623,712; 4,319,021; 4,946,940; 5,264,536; 6,683,153; 7,629,397; 7,650,930; U.S. Publication Nos. 2009/0259005; 2008/0090974; 2008/0027173; 2008/0033127; 2007/0299161; 2007/0244279; European Patent Nos. EP0149342B1; EP0184935B1; Canadian Patent Applications CA 2372121A1; CA 1203348; and German Patent Application DE 19905029.

The polymerization processes described in the above references are typically energy intensive, requiring heat exchanges between the polymerization reactor and the separator, supercritical polymerization conditions, and/or additional polymer-solvent separation means. There is a need to develop new polymerization processes that use solvent separation means that require less energy to run, and have increased efficiency and reduced costs. There is also a need to eliminate ancillary and energy intensive devices, and thus, reducing capital and operating costs. These needs and others have been met by the following invention.

SUMMARY OF INVENTION

The invention provides a solution polymerization process comprising:

A) polymerizing one or more monomers in the presence of a solvent that comprises a heavy hydrocarbon solvent and a light hydrocarbon solvent, to form a polymer solution;

B) transferring the polymer solution to a Liquid-Liquid Separator, without adding heat to the solution, and wherein the pressure of the polymer solution is actively reduced in a controlled manner prior to, or within, the Liquid-Liquid Separator, to induce at least two liquid phases, a polymer-rich phase and a solvent-rich phase, and wherein the concentration of polymer in the polymer-rich phase is higher than that in the polymer solution transferred to the liquid-liquid separator; and C) removing the solvent-rich phase.

DETAILED DESCRIPTION

Figure 1:
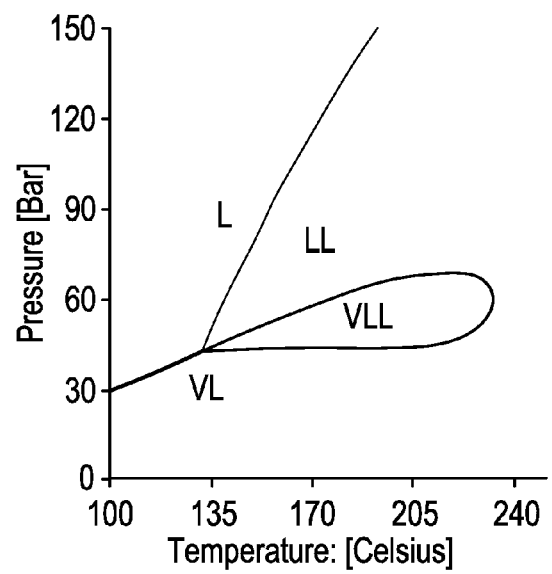
FIG. 1 depicts a phase diagram of a polymer solution exhibiting LCST (V=vapor and L=liquid).

As discussed above, the invention relates to a technique for removing solvent from polymer by using the phenomenon of Lower Critical Solution Temperature (LCST) in the solution process. The reaction solvent is a mixture of a heavy hydrocarbon solvent (for example, containing a C6~C10 hydrocarbon component) and a light hydrocarbon solvent (for example, containing a C2~C5 hydrocarbon component). The liquid-liquid separation can be achieved by dropping pressure, thereby inducing the formation of two phases, polymer-rich and solvent-rich liquid phases. The solvent-rich phase can be recycled back to the reactor, and the polymer rich phase can be processed further for complete solvent removal. The inventive process allows a lowering of the total plant heat load compared to existing technology. In addition, there is a need to lower the cooling load on existing polymerization processes. The inventive process reduces capital and operating costs by eliminating ancillary equipment and energy intensive devices, unique to existing polymerization processes.

As discussed above, the invention provides a solution polymerization process comprising:

A) polymerizing one or more monomers in the presence of a solvent that comprises a heavy hydrocarbon solvent and a light hydrocarbon solvent, to form a polymer solution;

B) transferring the polymer solution to a Liquid-Liquid Separator (LLS), without adding heat to the solution, and wherein the pressure of the polymer solution is actively reduced in a controlled manner prior to, or within, the Liquid-Liquid Separator, to induce at least two liquid phases, a polymer-rich phase and a solvent-rich phase, and wherein the concentration of polymer in the polymer-rich phase is higher than that in the polymer solution transferred to the liquid-liquid separator; and C) removing the solvent-rich phase.

In one embodiment, in step A, the one or more monomers are polymerized in the presence of a solvent that comprises a heavy hydrocarbon solvent and a light hydrocarbon solvent, to form a single phase polymer solution. The polymerization is preferably a single phase polymerization reaction.

In a preferred embodiment, the polymer concentration in the polymer rich phase is controlled by adjusting the amount of light hydrocarbon component in the solvent.

In one embodiment, the heavy hydrocarbon solvent comprises at least one hydrocarbon containing from 6 to 10 carbon atoms, preferably from 7 to 9 carbon atoms. The heavy hydrocarbon solvent does not comprise a hydrocarbon containing less than 6 carbon atoms, although residual amounts (typically less than 10000 ppm, based on total weight of heavy hydrocarbon solvent) of such hydrocarbons may be present. A "hydrocarbon," as used herein refers to an organic molecule made up of only carbon and hydrogen atoms.

In one embodiment, the light hydrocarbon solvent comprises at least one hydrocarbon containing from 2 to 5 carbon atoms, preferably from 2 to 4 carbon atoms. The light hydrocarbon solvent does not comprise a hydrocarbon containing more than 5 carbon atoms, although residual amounts (typically less than 10000 ppm, based on total weight of light hydrocarbon solvent) of such hydrocarbons may be present. A "hydrocarbon," as used herein refers to an organic molecule made up of only carbon and hydrogen atoms.

In one embodiment, the light hydrocarbon solvent is selected from ethane, propane, isobutane, or isopentane, or mixtures thereof, and preferably propane or isobutane.

In one embodiment, the amount of light hydrocarbon solvent is from 5 to 40 weight percent, and preferably 20 to 35 weight percent, based on the weight of the polymerization system.

In one embodiment, the heavy hydrocarbon solvent is selected from n-hexane, n-heptane, n-octane, iso-octane, n-nonane, n-decane, or mixtures thereof, preferably n-octane, iso-octane, n-nonane, n-decane, or mixtures thereof, and more preferably n-octane.

In one embodiment, in step A, the solvent comprises n-octane and isobutane.

In one embodiment, in step A, the solvent consists essentially of n-octane and isobutane.

In one embodiment, in step A, the solvent consists of n-octane and isobutane.

In one embodiment, in step A, the solvent comprises n-octane and propane.

In one embodiment, in step A, the solvent consists essentially of n-octane and propane.

In one embodiment, in step A, the solvent consists of n-octane and propane.

In one embodiment, both the heavy solvent and the light hydrocarbon solvent are mixed prior to the reactor.

In a preferred embodiment, there is no special unit operation (like distillation), in the polymerization process, to separate heavy and light hydrocarbon components of the solvent from each other.

In another embodiment, there is no special unit operation (like distillation), in the polymerization process, to separate the solvent from the monomers and co-monomers.

In a preferred embodiment, the polymerization of step A takes place in a reactor configuration selected from the group consisting of one of the following: (a) one reactor, and (b) two or more reactors configured in series. In a further embodiment, the each reactor in the reactor configuration does not contain a cooling system. In another embodiment, each reactor in the reactor configuration does contain a cooling system.

In a preferred embodiment, each reactor in the reactor configuration is an adiabatic reactor.

In one embodiment, the pressure in each reactor of step A is less than 18 MPa (180 Bar), preferably less than 15 MPa (150 Bar), more preferably less than 12 MPa (120 Bar).

In one embodiment, the pressure in each reactor of step A is from 40 Bar (4 MPa) to 180 Bar (18 MPa), preferably from 60 Bar (6 MPa) to 150 Bar (15 MPa).

In one embodiment, the pressure in each reactor of step A is from 110 Bar (11 MPa) to 150 Bar (15 MPa), preferably from 110 Bar (11 MPa) to 130 Bar (13 MPa).

In one embodiment, the polymerization temperature of step A is greater than 150° C., preferably greater than 155° C., more preferably greater than 160° C., and even more preferably greater than 170° C.

In one embodiment, the polymerization temperature of step A is from 170° C. to 220° C., preferably from 180° C. to 210° C., more preferably from 190° C. to 200° C.

In one embodiment, the polymerization temperature of step A is from 170° C. to 220° C., preferably from 180° C. to 220° C., more preferably from 190° C. to 220° C.

In one embodiment, the polymerization temperature of step A is from 170° C. to 200° C., preferably from 180° C. to 200° C., more preferably from 190° C. to 200° C.

In one embodiment, the solvent, in step A, is present in an amount greater than 40 weight percent, based on the weight of the polymerization system.

In one embodiment, the solvent, in step A, is present in an amount greater than 50 weight percent, based on the weight of the polymerization system.

In one embodiment, the solvent, in step A, is present in an amount greater than 60 weight percent, based on the weight of the polymerization system.

In one embodiment, the solvent, in step A, is present in an amount greater than 70 weight percent, based on the weight of the polymerization system.

In one embodiment, the solvent, in step A, is present in an amount greater than 80 weight percent, based on the weight of the polymerization system.

In one embodiment, the solvent, in step A, is present in an amount greater than, or equal to, 85 weight percent, based on the weight of the polymerization system.

In one embodiment, the solvent, in step A, is present in an amount greater than, or equal to, 90 weight percent, based on the weight of the polymerization system.

In one embodiment, the solvent, in step A, is present in an amount from 80 to 90 weight percent, preferably from 85 to 90 weight percent, based on the weight of the polymerization system.

In one embodiment, the light hydrocarbon solvent, in step A, is present in an amount from 20 to 50 weight percent, preferably from 25 to 45 weight percent, and more preferably from 30 to 40 weight percent, based on the weight of the polymerization system.

In one embodiment, the heavy hydrocarbon solvent, in step A, is present in an amount from 50 to 80 weight percent, preferably from 55 to 75 weight percent, and more preferably from 60 to 70 weight percent, based on the weight of the polymerization system.

In one embodiment, the light hydrocarbon solvent, in step A, is present in an amount from 25 to 60 weight percent, preferably from 30 to 50 weight percent, and more preferably from 35 to 45 weight percent, based on the weight of the solvent.

In one embodiment, the heavy hydrocarbon solvent, in step A, is present in an amount from 40 to 75 weight percent, preferably from 50 to 70 weight percent, and more preferably from 55 to 65 weight percent, based on the weight of the solvent.

In one embodiment, the solvent comprises from 20 to 50 weight percent, preferably 20 to 40 weight percent of the light hydrocarbon solvent, and from 80 to 50 weight percent, preferably 80 to 60 weight percent of the heavy hydrocarbon solvent, based on the sum weight of the light hydrocarbon solvent and the heavy hydrocarbon solvent.

In one embodiment, the heavy hydrocarbon solvent comprises a hydrocarbon with 6 or more carbon atoms, preferably 7 or more carbon atoms, more preferably 8 or more carbon atoms.

In one embodiment, the heavy hydrocarbon solvent comprises a hydrocarbon with 8 or more carbon atoms, preferably 9 or more carbon atoms, more preferably 10 or more carbon atoms.

In one embodiment, the light hydrocarbon solvent comprises a hydrocarbon with 5 or less carbon atoms, preferably 4 or less carbon atoms, more preferably 3 or less carbon atoms.

In one embodiment, the light hydrocarbon solvent comprises a C3 hydrocarbon, and the heavy hydrocarbon solvent comprises a hydrocarbon with 6 or more carbon atoms, preferably 7 or more carbon atoms, more preferably 8 or more carbon atoms.

In one embodiment, the light hydrocarbon solvent comprises a C3 hydrocarbon, and the heavy hydrocarbon solvent comprises a hydrocarbon with 8 or more carbon atoms, preferably 9 or more carbon atoms, more preferably 10 or more carbon atoms.

In one embodiment, the difference in carbon number between the highest boiling component of the heavy hydrocarbon solvent and the highest boiling component in light hydrocarbon solvent is at least 4, preferably at least 5, more preferably at least 6, and even more preferably at least 7.

In one embodiment, the temperature difference between the highest boiling component of the heavy hydrocarbon solvent and highest boiling component in the light hydrocarbon solvent is at least 125° C., preferably at least 150° C., more preferably at least 170° C., and even more preferably at least 200° C. Boiling points can be determined using ASTM E 1719-97 (boiling point is the temperature at which the vapor pressure is equal to one atmosphere (1.013 Bar)). Typically, the stirred flask ebulliometer (temperatures less than, or equal to, 200° C.) is used to measure boiling point. Also, boiling points can be typically found in CRC Handbooks of Chemistry and Physics, and the DIPPR (Design Institute for Physical Properties) 801 Database.

In one embodiment, the minimum boiling point of the highest boiler in the heavy hydrocarbon solvent is greater than 105° C., preferable greater than 120° C., more preferably greater than 150° C.

In one embodiment, the maximum boiling point of the highest boiler in the heavy hydrocarbon solvent is less than 200° C., preferable less than 180° C., more preferably less than 160° C.

In one embodiment, the maximum boiling point of the highest boiling component in the light hydrocarbon solvent is less than 35° C., preferably less than 0° C., more preferably less than −40° C.

Solvent analysis can be performed by GC-MS technique (for example, a commercially available petroleum column, temperature up to about 280° C.). Only the components with a mass fraction of one weight percent or more are considered in the analysis.

The solvent may comprise a combination of two or more embodiments as described herein.

In one embodiment, the polymerization, in step A, is operated in the subcritical region.

In one embodiment, the one or more monomers are fed into each reactor, used in the polymerization in step A, in the presence of greater than 40 weight percent solvent, based on the weight of the monomer(s) and solvent.

In one embodiment, the one or more monomers are fed into each reactor, used in the polymerization in step A, in the presence of greater than 80 weight percent solvent, based on the weight of the monomer(s) and solvent.

In one embodiment, the one or more monomers are fed into each reactor, used in the polymerization in step A, in the presence of greater than 85 weight percent solvent, based on the weight of the monomer(s) and solvent.

In one embodiment, the one or more monomers, in step A, are present in an amount less than, or equal to, 40 weight percent, based on the weight of the polymerization system.

In one embodiment, the one or more monomers, in step A, are present in an amount less than, or equal to, 35 weight percent, based on the weight of the polymerization system.

In one embodiment, the one or more monomers, in step A, are present in an amount less than, or equal to, 30 weight percent, based on the weight of the polymerization system.

In one embodiment, the one or more monomers, in step A, are present in an amount less than, or equal to, 25 weight percent, based on the weight of the polymerization system.

In one embodiment, the one or more monomers, in step A, are present in an amount less than, or equal to, 20 weight percent, based on the weight of the polymerization system.

In one embodiment, the one or more monomers, in step A, are present in an amount less than, or equal to, 15 weight percent, based on the weight of the polymerization system.

In one embodiment, the one or more monomers, in step A, are present in an amount less than, or equal to, 10 weight percent, based on the weight of the polymerization system.

In one embodiment, the one or more monomers, in step A, are present in an amount from 10 to 40 weight percent, based on the weight of the polymerization system.

In one embodiment, the one or more monomers, in step A, are present in an amount from 10 to 30 weight percent, based on the weight of the polymerization system.

In one embodiment, the one or more monomers, in step A, are present in an amount from 10 to 25 weight percent, based on the weight of the polymerization system.

In one embodiment, the one or more monomers, in step A, are present in an amount from 10 to 20 weight percent, based on the weight of the polymerization system.

In one embodiment, in step B, the polymer concentration in the polymer solution entering the Liquid-Liquid Separator is from 5 to 30 weight percent, based on the weight of the polymer solution.

In one embodiment, in step B, the polymer concentration in the polymer solution entering the Liquid-Liquid Separator is from 10 to 15 weight percent, based on the weight of the polymer solution.

In one embodiment, in step B, the polymer concentration in the polymer in the polymer-rich phase exiting the Liquid-Liquid Separator is from 20 to 50 weight percent, and preferably from 30 to 40 weight percent, based on the weight of the polymer-rich phase.

In one embodiment, no heat is added between each reactor and the Liquid-Liquid Separator.

In a preferred embodiment, the process does not contain a heating device, such as a heat exchanger between step A and step B.

In one embodiment, no heat is added to the polymer solution in step A and step B, by means of a heat exchanger.

In one embodiment, no heat is added to the polymer solution in step A and step B, by means of a higher temperature stream (higher energy).

In a preferred embodiment, step B is not repeated.

In one embodiment, in Step B, the pressure is reduced to a pressure in the range from 80 Bar (8 MPa) to 10 Bar (1 MPa), preferably from 70 Bar (7 MPa) to 30 Bar (3 MPa).

In one embodiment, after step B, the polymer-rich phase is heated to a temperature in the range from 180° C. to 250° C., preferably from 180° C. to 230° C.

In one embodiment, the polymer-rich phase is heated to a temperature in the range from 180 to 230° C., after leaving the Liquid-Liquid Separator.

In one embodiment, in step B, the polymer solution forms only two liquid phases.

In a preferred embodiment, no light hydrocarbon solvent is added to the step B or step C of the inventive process.

In a preferred embodiment, no phase separation agent is added to the polymerization solution prior to, or within, the Liquid-Liquid Separator. In a further embodiment, no phase separation agent is added to the polymerization solution after the Liquid-Liquid Separator.

Some examples of phase separation agents include H2, N2, CO, CO2, and CH4.

In one embodiment, the polymer-rich phase is heated downstream from the Liquid-Liquid Separator. In a further embodiment, the polymer-rich phase is heated to a temperature in the range from 180° C. to 250° C., preferably from 180° C. to 230° C.

In one embodiment, the process further comprises reducing the pressure of the polymer-rich phase down stream from the LLS, to form a solution containing greater than 40 weight percent polymer, preferably greater than 50 weight percent, based on the total weight of the solution. In a further embodiment, the polymer-rich phase is heated during the reduction of pressure.

In one embodiment, the at least two liquid phases formed in step B are not heated.

In one embodiment, the polymerization process does not comprise heating the at least two liquid phases.

In one embodiment, the polymer-rich phase does not contain more than 5 weight percent entrained "solvent-rich phase," based on sum weight of these two phases.

In one embodiment, in step B, the pressure in the Liquid-Liquid Separator is less than, or equal to, 800 psi, preferably less than, or equal to, 700 psi, and more preferably less than, or equal to, 600 psi.

In one embodiment, in step B, the pressure in the Liquid-Liquid Separator is from 400 psi to 800 psi, preferably 450 psi to 700 psi, and more preferably from 500 psi to 600 psi.

In one embodiment, the temperature in the Liquid-Liquid Separator is greater than, or equal to, 150° C., preferably greater than, or equal to, 160° C., and more preferably greater than, or equal to, 170° C.

In one embodiment, in step B, the temperature in the Liquid-Liquid Separator is from 150° C. to 220° C., preferably 160° C. to 210° C., and more preferably from 165° C. to 205° C.

In a preferred embodiment, the Liquid-Liquid Separator is a vessel.

In one embodiment, the Liquid-Liquid Separator has a capacity greater than, or equal to, 10 gallons.

In one embodiment, the Liquid-Liquid Separator has a capacity greater than, or equal to, 100 gallons.

In one embodiment, the Liquid-Liquid Separator has a capacity greater than, or equal to, 1000 gallons.

In one embodiment, the Liquid-Liquid Separator has a capacity greater than, or equal to, 10,000 gallons.

In one embodiment, the Liquid-Liquid Separator has a capacity greater than, or equal to, 50,000 gallons.

In one embodiment, the Liquid-Liquid Separator has a capacity from 10 to 50,000 gallons.

In one embodiment, the Liquid-Liquid Separator has a capacity from 100 to 25,000 gallons.

In one embodiment, the Liquid-Liquid Separator has a residence time less than, or equal to 40 minutes, preferably less than, or equal to 30 minutes, more preferably less than, or equal to 20 minutes. The residence time is the average amount of time a fluid (typically two phases) spends in the LLS. This time is calculated as the ratio of the "volume of the LLS vessel"/"volumetric flow rate of the fluid to the LLS inlet."

In one embodiment, the Liquid-Liquid Separator has a resident time less than, or equal to 15 minutes, preferably less than, or equal to 10 minutes, more preferably less than, or equal to 5 minutes.

In one embodiment, the Liquid-Liquid Separator has a resident time from 5 to 30 minutes, preferably from 5 to 25 minutes, more preferably from 5 to 20 minutes.

In a preferred embodiment, no mechanical mixing takes place in the Liquid-Liquid Separator.

In one embodiment, the Liquid-Liquid Separator, in step B, contains at least two liquid phases, and preferably two liquid phases. A liquid phase has a density greater than, or equal to, 0.2 g/cc, preferably greater than, or equal to, 0.3 g/cc, as determined gravimetrically.

The Liquid-Liquid Separator may comprise a combination of two or more embodiments as described herein.

In one embodiment, the polymerization in step A is a continuous polymerization.

In one embodiment, the polymerization in step A is a batch polymerization.

In one embodiment, the polymerization of step A does not comprise a fluorohydrocarbon.

In one embodiment, the polymerization of step A does not comprise a fluorocarbon.

In one embodiment, each polymerization reactor is not connected to a heat exchanger.

In a preferred embodiment, the polymerization is not an ionic polymerization.

In one embodiment, the polymer solution comprises a polymer selected from an ethylene-based polymer or a propylene-based polymer. In a further embodiment, the polymer is an ethylene-based polymer. In yet a further embodiment, the concentration of ethylene fed to the reactor is less than 30 weight percent, preferably less than 20 weight percent, based on the weight of feed to the reactor, if only one reactor is used, or based on the weight of the feed to each reactor, if more than one reactor is used. In a further embodiment, the ethylene-based polymer is an ethylene/alpha-olefin interpolymer. In a further embodiment, the alpha-olefin is a C3-C8, preferably a C4-C8 alpha-olefin. In a further embodiment, the interpolymer contains less than 30 weight percent of the alpha-olefin, based on the weight of the interpolymer.

In one embodiment, the ethylene-based polymer is an EPDM.

In one embodiment, the polymer solution from step A comprises from 5 to 30 weight percent of the polymer, based on the weight of the polymer solution.

In one embodiment, the polymer solution from step A comprises from 6 to 20 weight percent of the polymer, based on the weight of the polymer solution.

In one embodiment, the polymer solution from Step A comprises from 8 to 15 weight percent, based on the weight of the polymer solution.

In one embodiment, the polymer solution from Step A comprises from 10 to 12 weight percent of the polymer, based on the weight of the polymer solution.

An inventive polymerization process may comprise a combination of two or more embodiments as described herein. For example, the polymerization process may comprise a combination of polymerization temperature, reactor pressure, solvent type and amount, monomer(s) amount(s), and/or other embodiments described herein.

In one embodiment, the catalyst is deactivated before, or after, the polymer solution is transferred to the Liquid-Liquid Separator. In another embodiment, the catalyst is deactivated after the polymer solution is transferred to the Liquid-Liquid Separator. In one embodiment, in step C, the solvent-rich phase is returned to the polymerization of step A.

In one embodiment, the solvent is removed from the polymer in one or two stages of devolatilizations.

In one embodiment, the solvent is removed from the polymer using a devo-extrusion process.

In one embodiment, the process further comprises transferring the polymer-rich phase to a first stage devolatizer, located downstream from the Liquid-Liquid Separator. In a further embodiment, the first stage devolatizer operates at a pressure greater than 5 Bar (0.5 MPa).

In one embodiment, the process does not comprise transferring recycle monomer to a compressor, which is used to pressurize vaporized monomer into fluid, for transfer to the reactor.

In one embodiment, the process further comprises heating (for example, using a heat exchanger) the polymer-rich phase downstream from the Liquid-Liquid Separator. This heating element may be located upstream from a devolatizer, which is located downstream from the Liquid-Liquid Separator. In a further embodiment, the polymer-rich phase is heated prior to, or within, the devolatizer.

As discussed above, it has been discovered that the inventive process allows a lowering of the total plant heat input compared to conventional technology, because heat is added only to the polymer-rich phase downstream of the Liquid-Liquid Separator (LLS). In addition, the cooling load required to cool the solvent-rich phase downstream from the LLS is also lower, because no heat is added prior to the LLS.

The inventive process can significantly save capital and operating costs by elimination of the following: 1) the more expensive reactors employing heat removal, since an adiabatic reactor can be used, 2) a recycle monomer compressor, and 3) a hydrogen-stripping column. Heat may be added to the polymer rich phase (for example, using a heat exchanger) to aid in the devolatilization of the solvent. In one embodiment, the heat exchanger is design to handle multiple phases since fluid is at phase boundary. Any addition of heat, or drop in pressure, will form a second liquid phase, and possibly a vapor phase. A pump may used to increase pressure, such that the heat exchanger operation is single phase (homogenous).

Also, for mixed solvent systems, there is no need to separate the light hydrocarbon solvent from the heavy hydrocarbon solvent, because both can be recycled together to the reactor feed(s). It has been discovered, that instead of using a pre-heater to control the polymer concentration of the Liquid-Liquid Separator exit streams, the light hydrocarbon solvent concentration can be readily adjusted to maintain a constant concentration of light hydrocarbons (for example, propane plus propylene (comonomer)) in the reactor for different product grades (polymers with different levels of the same comonomers). In addition, the same type Liquid-Liquid Separator can be used for different polymer families (polymers containing different comonomers).

For solution polymer processes the traditional approach to separate the solvent, monomer and comonomer from a polymer solution is devolatilization. In this scenario, the devo operation is carried out downstream from the Liquid-Liquid Separator. Polymer devolatilization is where the volatile materials in a polymer solution are flashed into a vapor phase. After reaction, multiple stages of devolatilization are typically required, each subsequent stage operating at a lower pressure than the prior stage. The final stage is typically operated at a deep vacuum to achieve the desired low level of residual volatile organic compounds left in the polymer. Operating at a deep vacuum (5 to 30 mbar) is both energy and capital intensive, relative to the amount of vapor that must be handled. The prior stages of devolatilization reduce the amount of volatile material that must be processed by the vacuum equipment, such as blowers, compressors and vacuum pumps, allowing the design of such equipment to be at a reasonable size. Another technique used to reduce the size of the vacuum equipment is to cool and condense a majority of the vapor, at these deep vacuum pressures, prior to the subsequent pressure increasing devices.

The choice of solvent, and the monomer and comonomer composition, have a fundamental impact on the devolatilization operation. Significant quantities of light monomers, such as ethylene or propylene, do not easily condense, and it is impractical to pull a deep vacuum in the isolation process to remove these monomers. These light components do preferentially vaporize, such that a first stage of devolatilization can be operated at a practical pressure to allow easy removal of the vast majority of these light components, as well as remove much of the solvent. The subsequent stage may then pull a deep vacuum, provided that the solvent is not too volatile. A volatile organic solvent that is light enough to promote liquid-liquid equilibrium (for example, C5 or smaller) is also too light to easily condense at reasonable refrigeration temperatures (that is, >−20° C.). Colder temperatures require special materials of construction for use with deep vacuum conditions (that is, 5 to 30 mbar). Although the residual solvent left in the polymer will be less for a lighter solvent, at the same pressure, than a heavier solvent (for example, n-octane), the vacuum system will be less efficient in achieving a deep vacuum, as the light solvent will not as easily condense. What is not intuitively obvious, is that a lighter solvent can lead to poorer performance of the devolatilizing system, bringing about the need to add a third stage of devolatilization. Using a mixed solvent approach, based on the invention here, allows the majority of the lighter component (unreacted C2 to C5 monomers and co-monomers and light solvent) to flash off in the first stage leaving a solvent that is condensable under deep vacuum conditions, and thus making a two stage devolatilizing system practical.

In one embodiment of the inventive process, the solvent is removed from the polymer in one or two stages of devolatilizations. In a further embodiment, each devolatilization stage is operated at a pressure less than, or equal to, 30 Bar.

In one embodiment, the solvent is removed from the polymer in two devolatilization stages. In a further embodiment, the first devolatilization stage is operated at a pressure from 1 to 15 Bar, preferably from 6 to 10 Bar. In a further embodiment, the second devolatilization stage is operated at a pressure from 5 to 30 mbar, preferably from 10 to 20 mbar.

Typically, the solvent is removed or separated from the polymer, leaving a residual level in the polymer that is acceptable, with regard to industrial practices, which are set by safety, environmental, FDA, and product quality requirements.

It has also been discovered that the solvent mixture of heavy and light hydrocarbons helps eliminate the solvent composition drift, and subsequently the risk of deteriorating the liquid-liquid separation performance, that results from the gradual isomer and inert build-up from the impurities in monomer and commoner, when a single component solvent is used as the polymerization solvent.

In one embodiment, the inventive process uses a single stage vacuum system that is not coupled with a multi-stage vacuum system, and is not coupled with a devolatilization extruder.

The use of a mixture of heavy and light hydrocarbon solvents allows the control of the liquid-liquid phase separation behavior in the Liquid-Liquid Separator. This control feature can adjust for the changes in the solvent composition due to product transitions, build-up of impurities in the monomers/co-monomers, or other changes in solvents, products and/or reactants. The composition of the polymer-rich phase in the Liquid-Liquid Separator can be maintained at the desired operating level.

An inventive process may comprise a combination of two or more embodiments as described herein. For example, the polymerization process may comprise a combination of polymerization temperature, reactor pressure, solvent type and amount, monomer(s) amount(s), and/or other embodiments described herein.

DEFINITIONS

Any numerical range recited herein, includes all values from the lower value and the upper value, in increments of one unit, provided that there is a separation of at least two units between any lower value and any higher value. As an example, if it is stated that a process parameter, physical or other property, such as, for example, temperature (° C.), pressure, etc., is from 20 to 100, it is intended that all individual values, such as 20, 21, 22, etc., and sub ranges, such as 20 to 44, 55 to 70, 75 to 100, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to temperature, pressure, and other properties.

The term "polymer," as used herein, refers to a polymeric compound prepared by polymerizing monomers, whether of the same or a different type. The generic term polymer thus embraces the term homopolymer (employed to refer to polymers prepared from only one type of monomer), and the term interpolymer as defined hereinafter. The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "olefin-based polymer," as used herein, refers to a polymer that contains at least a majority weight percent, based on the weight of the polymer, polymerized olefin (for example, ethylene or propylene), and, optionally, one or more additional comonomers.

The term "ethylene-based polymer," as used herein, refers to a polymer that contains at least a majority weight percent polymerized ethylene (based on the weight of polymer), and, optionally, one or more additional comonomers.

The term "propylene-based polymer," as used herein, refers to a polymer that contains at least a majority weight percent polymerized propylene (based on the weight of polymer), and, optionally, one or more additional comonomers.

The term "polymer-rich phase," as used herein, in relation to two or more phases under consideration, refers to the phase containing the greater concentration of polymer, as measured by its weight fraction, based on the total weight of the polymer-rich phase.

The term "solvent-rich phase," as used herein, in relation to two or more phases under consideration, refers to the phase containing the greater concentration of solvent as measured by its weight fraction, based on total weight of the solvent-rich phase.

The term "heavy hydrocarbon solvent," as used herein, refers to a non-reactive (with respect to polymerization catalyst) hydrocarbon, containing at least one hydrocarbon containing six or more carbon atoms. Typically, heavy hydrocarbon solvents have a normal boiling point higher than 95° C. The heavy hydrocarbon solvent does not comprise a hydrocarbon containing less than six carbon atoms, although residual amounts (typically less than 10000 ppm, based on total weight of heavy hydrocarbon solvent) of such hydrocarbons may be present. A "hydrocarbon," as used herein refers to an organic molecule made up of only carbon and hydrogen atoms. Examples are alkanes like n-octane, n-nonane, iso-octane, and alkenes like internal isomers of octene (those with double bond not located on a terminal carbon atom).

The term "light hydrocarbon solvent," as used herein, refers to a non-reactive (with respect to polymerization catalyst) hydrocarbon, containing at least one hydrocarbon containing five or less carbon atoms. Typically, light hydrocarbon solvents have a normal boiling point lower than 40° C. The light hydrocarbon solvent does not comprise a hydrocarbon containing more than five carbon atoms, although residual amounts (typically less than 10000 ppm, based on total weight of light hydrocarbon solvent) of such hydrocarbons may be present. A "hydrocarbon," as used herein refers to an organic molecule made up of only carbon and hydrogen atoms. Examples include ethane, propane, isobutene, and the like.

A phase, as used herein, refers to is a region of space (a thermodynamic system), throughout which all physical properties of a material are essentially uniform. Examples of physical properties include density, index of refraction, and chemical composition.

A liquid-liquid phase is a combination of two separate liquid phases which are not miscible.

The term "Liquid-Liquid Separator (LLS)," as used herein, refers to a device used for the separation of two or more liquid phases. The separation results from the specific action, for example, a reduction in pressure, taken to induce two or more liquid phases.

The term "polymer solution," as used herein, refers to the complete dissolution of polymer in one or more solvents (typically much lower in molecular weight than polymer) to form a homogeneous (most often in liquid state) phase. The solution comprises the polymer and solvent, and may also comprise unreacted monomers and other residuals of the polymerization reaction.

The term "solvent," as used herein, refers to a substance (for example, a hydrocarbon or a mixture of two or more hydrocarbons (excluding monomer and comonomer)) that dissolves a species of interest, like a monomer and/or polymer, resulting in a liquid phase.

The term "mixed solvent," as used herein, refers to a mixture of two or more solvents (for example, a mixture of two or more hydrocarbons).

The term "single solvent," as used herein, refers to one solvent (for example, one hydrocarbon).

The term "solution polymerization," as used herein, refers to a polymerization process in which the formed polymer is dissolved in the polymerization solvent.

The term "phase separation agent," as used herein, refers to a substance, which, when added to an existing polymer solution, has the effect of lowering the Lower Critical Solution Temperature (LCST) at a given polymer weight fraction.

Lower Critical Solution Temperature (LCST), as used herein, is defined as the temperature, above which, a solution of fixed composition, at a fixed pressure, separates into two liquid phases, and, below this temperature, the solution exists as a single liquid phase.

The term "polymerization system," as used herein, refers to a mixture comprising monomers, solvent and catalyst, and which will undergo polymerization reaction under appropriate conditions. The polymerization system corresponds to the total feed to the reactor.

The term "adiabatic reactor," as used herein, refers to a reactor which has no active heat removal mechanism and no active heat addition mechanism.

The term "pressure reducing means," as used herein, refers to a device, such as a control valve, that allows reduction in pressure of a continuous stream of liquid or a fixed batch of liquid.

The phrase "actively reduced in a controlled manner," as used herein, refers to an action, such as the use of a control valve, to reduce pressure to a desired level and at a desired rate.

The term "single phase polymer solution," as used herein, refers to the complete dissolution of polymer in one or more solvents (typically much lower in molecular weight than polymer) to form a homogeneous (most often in liquid state) phase.

The phrase "concentration of polymer in the polymer-rich phase," as used herein, refers to the weight fraction of the polymer, based on the total weight of the solution containing the polymer (polymer-rich phase).

The phrase "concentration of polymer in the solvent-rich phase," as used herein, refers to the weight fraction of the polymer, based on the total weight of the solution containing the polymer (solvent-rich phase).

The term "subcritical region," as defined herein, refers to a polymerization temperature below the critical temperature of the polymerization medium (defined as the mixture of solvent(s), monomer and comonomer(s) [no catalyst(s) or cocatalyst(s)]), and a polymerization pressure below the critical pressure of the polymerization medium.

The term "critical temperature," as used herein, refers to the temperature of the polymerization medium, above which, the polymerization medium does not phase separate, regardless of any pressure change.

The term "critical pressure," as used herein, refers to the pressure of the polymerization medium, above which, the polymerization medium does not phase separate, regardless of any temperature change.

Define cloud point pressure is the pressure, below which, the polymer solution of a fixed composition at a fixed temperature, separates into two liquid phases. Above this pressure, the polymer solution is a single liquid phase.

Cloud point temperature is the temperature above (threshold temperature) which, the polymer solution of a fixed composition at a fixed pressure, separates into two liquid phases. Below this temperature, the polymer solution is a single liquid phase. In addition, the cloud point temperature may also be a ceiling temperature, below which, two phases exist, and above which, one phase exists.

The terms "comprising", "including", "having" and their derivatives are not intended to exclude the presence of any additional component, step or procedure, whether or not the same is specifically disclosed. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Determination of the Weight Fraction of Polymer and Weight Fraction of Solvent in a Phase.

The amount of polymer and solvent in a given binary solution is determined from the weight of the solution. The solvent is then evaporated completely, and the dried polymer is weighed. The weight of dry polymer is the amount of polymer initially present, and the weight of the solvent is determined from the difference between the weight of the solution and the weight of the polymer. From the amounts of solvent and polymer, one can calculate the weight fraction of each. Care should be taken to minimize the evaporation of low molecular weight fractions from the polymer. This can be accomplished by evaporating the solvent at low temperatures under vacuum (such as in a roto-vaporator).

For determination of phase boundaries (temperature and pressure), compositional measurements can be completely avoided by making up a solution of known composition, and then measuring the cloud point. When a solution of a particular fixed composition changes from a single liquid phase to two-liquid phases, either by a change in temperature or pressure, or both, the appearance of the mixture changes from clear to cloudy, due to the difference in the refractive indices of the two phases. This test is very effective in determining very small amounts of the second liquid phase. Thus, it can be taken as the measurement of incipient phase separation, or in other words, the phase boundary.

For a vapor-liquid equilibrium (VLE) measurement, some headspace above the liquid solution remains to allow vapor formation. The headspace should be such that the amount of solvent vaporized is small, so as to minimize the change in liquid composition. The temperature of the system is adjusted to the desired value, and then the total pressure is in the vapor headspace is measured. It is important to stir the liquid phase solution below the headspace to ensure thermodynamic equilibrium.

EXPERIMENTAL

Figure 2:
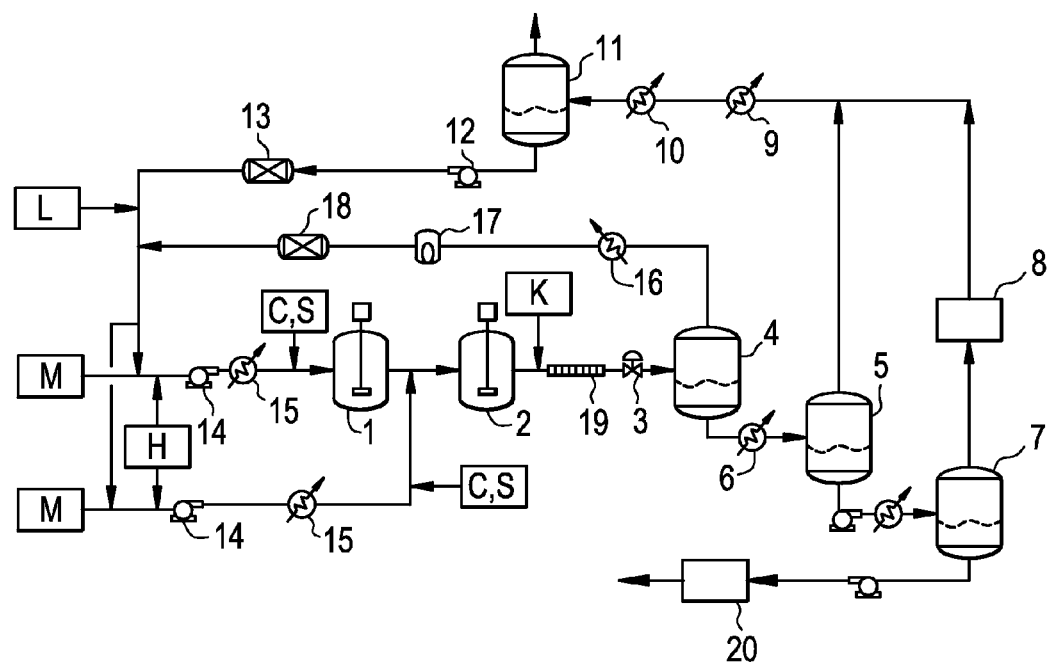
FIG. 2 depicts a solution polymerization process using liquid-liquid separation.
Figure 3:
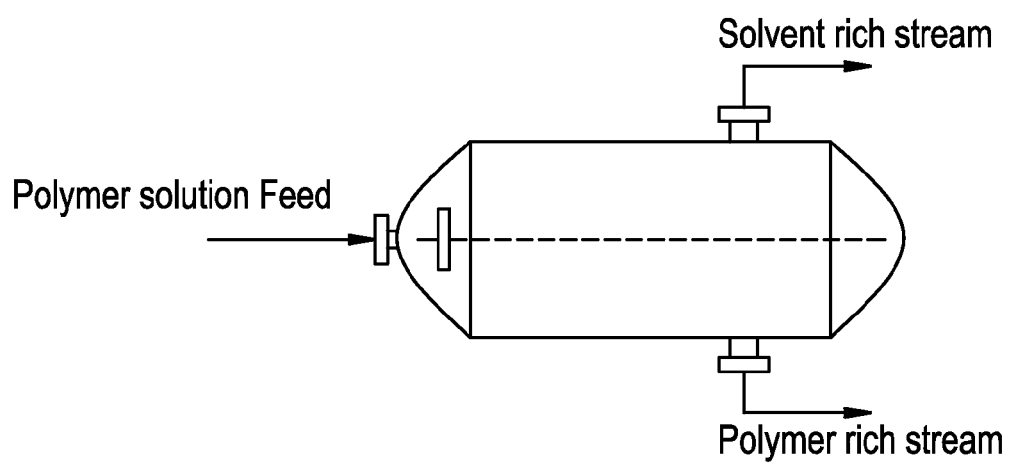
FIG. 3 is a schematic of a Liquid-Liquid Separator.

A suitable process flow diagram of an example solution polymerization is shown in FIG. 2. Two reactors [1, 2], each with no heat removal mechanism, are used in the polymerization. A control valve [3] is used for pressure reduction. A Liquid-Liquid Separator (LLS) [4] is for separating the polymer-rich and solvent-rich liquid phases. A first stage devolatilizer [5] is for removing solvent by vaporization. A heat exchanger [6] is also shown. A second stage devolatilizer [7] is used for additional solvent removal by operating near vacuum (5-30 mbar) conditions. This process configuration also contains vacuum system device [8], condensing exchangers [9, 10] for solvent vapors, a recycle solvent flash drum [11], a pump [12], a recycle solvent purification bed [13], a feed pump [14], a feed cooling exchanger [15], and a cooling exchanger [16]. The solvent-rich phase exiting the LLS can be filtered through a filter [17] to remove polymer particles. If the catalyst is deactivated upstream from the LLS, the solvent-rich phase exiting the LLS can be subject to purification bed [18] to remove the catalyst kill agent(s). To facilitate catalyst deactivation, the catalyst kill agent(s) and the reactor outlet stream can be mixed in a static mixer [19]. The final polymer product, after subject to solvent removal (under vacuum), can be pelletized using a pelletization system [20].

The polymerization is carried out in one or more adiabatic reactors. The number of reactors depends on the polymer type and desired molecular weight distribution. The reactor pressure is typically from 40 Bar (4 MPa) to 150 Bar (15 MPa). The reactor operating temperature is typically from 140° C. to 190° C. The reaction solvent is a mixture of a heavy hydrocarbon solvent and an light hydrocarbon solvent. Examples of suitable heavy hydrocarbon solvents include n-heptane, n-octane, n-decane, and the like. Examples of suitable light hydrocarbon solvents include ethane, propane and isobutane. Typical light hydrocarbon solvent concentrations is from 5 weight percent to 40 weight percent, based on weight of the polymerization system.

Once the polymerization is completed, the polymer solution is transferred to the LLS [4]. The pressure in the LLS is reduced to induce a liquid-liquid separation, thus forming a polymer-rich phase and a solvent-rich phase. The polymer-rich phase is separated from the solvent-rich phase within the LLS using gravity or an enhanced gravity device. The solvent-rich phase is cooled [16], filtered [17], and recycled back to the reactor [1 and/or 2].

The polymer-rich phase is passed through a heat exchanger [6] and then fed to the first devolatilizer [5]. A catalyst-kill [K] is added to the polymer-rich phase before this phase enters the first devolatilizer. The pressure in the first devolatilizer is reduced to form a polymer solution containing more than 50 weight percent polymer, based on the weight of the concentrated polymer-rich phase.

For final solvent removal from the concentrated polymer-rich phase, the concentrated phase exiting the first devolatizer [5] is transferred to a second devolatizer [7]. Here, the pressure is reduced to form polymer with residual amounts (ppm levels) of solvent. The solvent coming out the second devolatizer is condensed, combined with solvent from first devolatizer, and the combined solvent is then purified [13] to remove the products of the catalyst kill, and then recycled back to the reactor [1 and/or 2]. The polymer is sent to a further material handling system, such as a pelletizer [20].

This process does not require a recycle monomer compressor downstream from the first devolatizer [5] and/or the second devolatizer [7]. Also, the operating pressure of drum [11] can be kept sufficiently high, in order to maintain a monomer yield greater than 99%, with the use of a recycle monomer compressor. Here, monomer yield refers to the amount of fresh monomer converted to polymer; for example, a 99% ethylene yield means that 99% of the fresh ethylene added to the polymerization process would be converted to polymer.

The following steps may be added between the separation step in the LLS, and the recycling step of the solvent, from the solvent-rich phase, back to the reactor.

A second LLS can be added downstream of a heat exchanger [6], located downstream of the first LLS [4], to further concentrate polymer rich stream.

The heat exchanger [6] can be eliminated before first devolatilizer [5].

The catalyst kill can take place before the LLS [4]. This proposal would also require the addition of an adsorption bed [18] to remove the products of the catalyst kill, and located downstream from the filter [17], and before the recycled stream is returned to the reactor [1 and/or 2]. One of the benefits of this new design is that the reaction is terminated prior to entering the LLS [4]. This eliminates any potential for further reaction in the LLS, which can affect the finished polymer properties.

Computer Simulated Process

A computer simulation of the polymerization of an amorphous grade EPDM in-situ blend (A) and a semi-crystalline EPDM in-situ blend (B) was performed using ASPEN PLUS computer software (available from ASPEN Technology) and VLXE computer software (available from VLXE Incorporated). A computer simulation of each in-situ blend was performed in a solution polymerization process containing two continuous stirred reactors in series, as shown above. The concentrations of the stream exiting the second reactor for each in-situ blend are shown below in Table 1. Each weight percent is based on the sum weight of these stream components.

TABLE 1

Simulated Stream of Second Reactor Outlet

| | EPDM A | EPDM B |
|---|---|---|
| Ethylene | 1.5 wt % | 1.5 wt % |
| Propylene | 12 wt % | 4 wt % |
| ENB | 0.5 wt % | 0.5 wt % |
| Propane | 25 wt % | 33 wt % |
| ISOPAR-E* | 48 wt % | 48 wt % |
| EPDM | 13 wt % | 13 wt % |

*Available from ExxonMobil

Each reactor exit stream is introduced to a Liquid-Liquid Separator (LLS) after dropping drop the pressure, upstream of the LLS, from 120 bars to 60 bars. For each polymerization, the polymer concentration in the polymer rich phase that exits the LLS is determined to be about 37 weight percent, based on the total weight of the exiting stream. It was discovered that these consistent liquid-liquid separation results from two different inlet conditions could be achieved by adjusting the propane amount in the reactor feed, so that the total amount of C3 (propane plus propylene-wt %, based on the on the sum weight of the stream components) in the LLS were kept relatively unchanged. Thus, it is possible to control the liquid-liquid separation of different EPDM blends by adjusting the level of propane (light hydrocarbon solvent) in the feed to the first reactor.

Determination of Cloud Point Pressure for a Set Temperature and Set Composition

Figure 4:
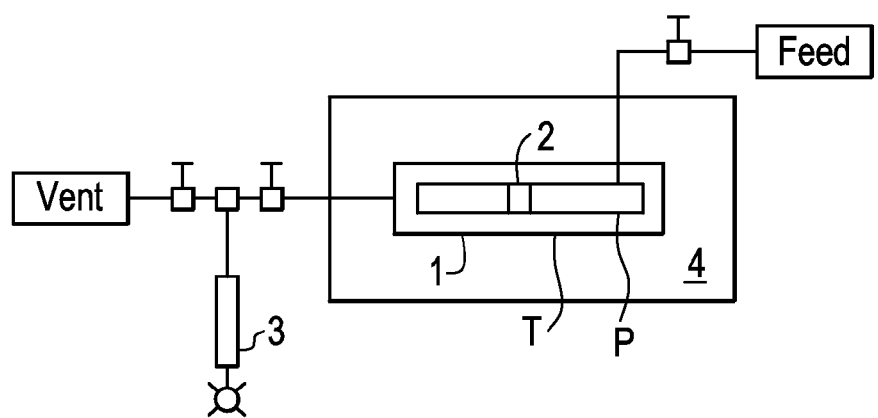
FIG. 4 is a schematic of a Variable-Volume View Cell. In this figure, [1] is the view cell, [2] is a piston, [3] is a hand pump (to move piston), [4] is a temperature bath, [T] is a temperature probe, and [P] is a pressure transducer.

Cloud point measurements were conducted in a high pressure, visual cell [1], for example, see FIG. 4. See also, Gutowski et al., "A Low-Energy Solvent Separation Method," Polymer Engineering and Science, 1983. 23(4), pp. 230-237. The internal volume of the cell is approximately 50 mL, and a piston [2] is located in a bottom hole of the cell. This piston can be moved to change the internal volume of the cell, and thus, can be used to adjust the pressure by compressing the fluid in the cell. A system (polymer mixture) can be evaluated at temperatures up to 200° C. and pressures up to 1500 psia (103.5 Bar, 10.35 MPa).

A known amount of polymer was added to cell through the stirrer connection at the top of the cell. The stirrer was then installed, and the apparatus was lowered into a silicone oil bath [4], equilibrated at ambient temperature. The atmosphere within the cell was evacuated using a vacuum pump. A known amount of octane was added to the cell using a weighted syringe. Next, a known amount of propane was added to the cell using a RUSKA syringe pump. The amounts of propane, octane, and polymer within the cell, initially were calculated, such that the total volume in the cell, at ambient temperature, was about "0.5 to 1 mL" less than the total volume (as a liquid) of the cell with the piston at its lowest position. For example, the polymer content can range from 10-15 weight percent, the propane content can range from 25-30 weight percent, and the octane content comprises the balance of the mixture within the cell. The oil bath was heated to the desired temperature, and the mixture in the cell was stirred.

Initially, the mixture had two liquid phases, a clear solvent-rich phase and a whitish polymer-rich phase. Once the system reached the desired temperature, the pressure in the cell was increased by moving the piston at the bottom of the cell, until the mixture became a homogeneous single liquid.

The homogeneous mixture was held at a pressure above the "minimum pressure at which two phases were observed" for about five minutes with no stirring. The pressure in the apparatus was slowly decreased. The contents of the apparatus were observed visually, and the cloud-point pressure recorded when the mixture in the cell became cloudy (observed by an instantaneous change in color from clear-whitish to black). The system pressure was increased, and the cloud-point measurement was repeated 3-5 times. Once the cloud-point pressure was determined for a specific temperature, the temperature of the oil bath was increased to the next desired temperature, and the cloud-point pressure measurement was repeated for each additional temperature.

The above procedure was repeated, however, the initial pressure was above the determined cloud point pressure, and the final pressure was about 250-300 psia below the cloud point pressure. The pressure was reduced rapidly (about 100 psi/sec). The homogeneous, single phase solution instantaneously became cloudy, and within about five minutes, a clear liquid phase was observed above an opaque phase.

Although the invention has been described in considerable detail in the preceding examples, this detail is for the purpose of illustration, and is not to be construed as a limitation on the invention as described in the following claims.

The invention claimed is:

1. A solution polymerization process comprising:
   A) polymerizing one or more monomers in the presence of a solvent that comprises a heavy hydrocarbon solvent comprising a hydrocarbon with 6 or more carbon atoms and a light hydrocarbon solvent comprising a hydrocarbon with 5 or fewer carbon atoms, to form a polymer solution;
   B) transferring the polymer solution to a Liquid-Liquid Separator, without adding heat to the solution, and wherein the pressure of the polymer solution is actively reduced in a controlled manner prior to, or within, the Liquid-Liquid Separator, to induce at least two liquid phases, a polymer-rich phase and a solvent-rich phase, and wherein the concentration of polymer in the polymer-rich phase is higher than that in the polymer solution transferred to the Liquid-Liquid Separator; and
   C) removing the solvent-rich phase.

2. The process of claim 1, wherein in step A, the one or more monomers are polymerized in the presence of a solvent that comprises of a heavy hydrocarbon solvent and a light hydrocarbon solvent, to form a single phase polymer solution.

3. The process of claim 1, wherein the polymer concentration in the polymer rich phase is controlled by adjusting the amount of light hydrocarbon component in the solvent.

4. The process of claim 1, wherein the polymerization of step A takes place in a reactor configuration selected from the group consisting of one of the following: (a) one reactor, and (b) two or more reactors configured in series.

5. The process of claim 4, wherein the each reactor in the reactor configuration does not contain a cooling system.

6. The process of claim 5, wherein each reactor in the reactor configuration is an adiabatic reactor.

7. The process of claim 1, wherein the pressure in each reactor of step A is less than 18 MPa.

8. The process of claim 1, wherein the pressure in each reactor is from 110 bar (11 MPa) to 150 bar (15 MPa).

9. The process of claim 1, wherein the polymerization temperature of step A is greater than 150° C.

10. The process of claim 1, wherein the solvent in step A is present in an amount greater than 80 weight percent, based on the weight of the polymerization system.

11. The process of claim 1, wherein step B is not repeated.

12. The process of claim 1, wherein no light hydrocarbon solvent is added to the process in steps B and C.

13. The process of claim 1, wherein in Step B, the pressure is reduced to a pressure in the range from 80 bar (8 MPa) to 10 bar (1 MPa).

14. The process of claim 1, wherein the polymer formed in step A is selected from an ethylene-based polymer or a propylene-based polymer.

15. The process of claim 14, wherein the polymer is an ethylene-based polymer.

* * * * *